United States Patent [19]

Tome

[11] 4,095,932
[45] Jun. 20, 1978

[54] APPARATUS FOR MAKING CONTINUOUS CHAIN

[76] Inventor: Frank Tome, 666 W. Sandy Ridge Rd., Doylestown, Pa. 18901

[21] Appl. No.: 769,411

[22] Filed: Feb. 17, 1977

[51] Int. Cl.² .............................................. B29F 1/022
[52] U.S. Cl. ..................................... 425/575; 249/57; 425/588; 59/12;35
[58] Field of Search .................... 425/250, 129 R, 575, 425/588; 249/57; 164/90; 264/242

[56] References Cited

U.S. PATENT DOCUMENTS

| 2,388,986 | 11/1945 | Morin ....................................... 249/57 |
| 3,328,848 | 7/1967 | Heiche z et al. ................... 249/57 X |
| 3,333,299 | 8/1967 | Florjancic ............................. 425/250 |

FOREIGN PATENT DOCUMENTS

1,366,932   6/1964   France .................................. 425/129

Primary Examiner—Francis S. Husar
Assistant Examiner—William R. Briggs
Attorney, Agent, or Firm—Zachary T. Wobensmith, 2nd; Zachary T. Wobensmith, III

[57] ABSTRACT

Apparatus and methods are provided for making a continuous chain of interengaged loops, preferably of molded synthetic plastic, which employs a plurality of sets of separable dies with loop forming cavities which are preferably in planes at 90° to form a length of interengaged links, certain dies of each set being advanced to advance the chain, and returned to the beginning for subsequent advance, provision being made for formation of a link engaging an end link of a previously formed link of a length of interengaged links and for making links of the chain of different colors.

10 Claims, 12 Drawing Figures

APPARATUS FOR MAKING CONTINUOUS CHAIN

BACKGROUND OF THE INVENTION

1. Field of the Invention

This invention relates to apparatus for making continuous chain, of synthetic plastic or other desired materials.

2. Description of the Prior Art

Various machines have heretofore been proposed for the making of chain composed of a continuous series of links in engagement.

Klatte, in U.S. Pat. No. 537,780, discloses a roll for rolling chain out of malleable metal but does not show the simultaneous formation of a plurality of links, then advancing the chain thus formed and successively forming pluralities of links in series and continuous with the links previously formed.

Herron, in U.S. Pat. No. 923,521, forms a solid link which is manually placed in the end cavity of a mold, then closing the mold and forming a link interlooped with the end link of the chain previously formed, and the operation is repeated link by link.

Leblanc, in U.S. Pat. No. 1,083,841, shows a four part mold in which the parts are hinged together and provided with quarter grooves which coact to form a semi-circular channel open at the end of the mold and adapted to receive by manual insertion the last link of a previously cast section so that this section may be connected with the next section cast.

Craven, in U.S. Pat. No. 1,242,325, shows apparatus for forging links of chain which is unsuited for making chain of plastic or by injection molding.

Cowles, in U.S. Pat. No. 1,431,443, shows apparatus for rolling chain without welding but this bears little resemblance to the apparatus of the present invention.

Fawcett, in U.S. Pat. No. 1,656,371, shows apparatus employing a mult-part mold for cast steel chain but in which the links must be placed in the mold by hand to achieve a continuous length of chain.

Kloss, in U.S. Pat. No. 2,348,979, shows a mold for casting metal chain in said molds and in which the operator has to arrange the components. An inherent limitation on the length of the chain is imposed by the length of the mold.

Morin, in U.S. Pat. No. 2,388,986, shows apparatus for producing intercoupled relatively movable castings in which the links must be trimmed and cut apart and the ends of the links formed in another operation to make a uniform chain.

Deiss, in U.S. Pat. No. 2,498,031, shows a chain making machine employing a two-part mold for making one link at a time with grippers for trimming off the gates and locating the molded links which has little resemblance to the apparatus of the present invention either as to the molds or their utilization.

Ronceray, in U.S. Pat. No. 2,606,348, shows a mold for the fabrication of metallic chains by the lost wax or investment casting process and with which only a limited length of chain can be made. The molds must be carefully taken apart to remove the chain and reassembled by hand for the next casting operation.

Heichel et al., in U.S. Pat. No. 3,328,848, shows a chain molding device with four separable mold sections required to form a single link and a holding device which must be rotated 90° and back after each molding cycle to make a chain.

Ross, in U.S. Pat. No. 3,469,284, shows chain making apparatus with separable dies having cavities for forming a plurality of connected links. Manual insertion of an end link of a previously molded chain is required to attain continuity.

Funke, in U.S. Pat. No. 3,490,100, shows a mold for molding link chains of plastic material which also requires manual insertion of an end link of a previously molded chain to attain continuity.

Nelson, in U.S. Pat. No. 3,507,112, shows apparatus for casting chains with elliptical links, a four part mold being employed, one part of which is mounted in a stationary position, the other part being separable by horizontal movement and with passageways to form a plurality of links. No provisions are made for advancing the molds from their paths of movement or for continuity.

Russo, in U.S. Pat. No. 3,588,959, shows apparatus for molding plastic link chain employing four dies separable outwardly for release of the chain after molding. The feed neck portions require a physical pull to free the links. The length of the chain is limited by the length of the mold although the next section may be formed and integrally engaged by manually placing the last or free link into the last molding cavity and then molding the length permitted by the length of the mold.

Florjancic, in U.S. Pat. No. 3,718,420, shows apparatus for producing with multipart molds one annularly closed interconnected element by injection, the parts of the molds being in two planes of division perpendicular to one another with recesses in one plane being designed to receive prefabricated interconnected elements for connection by the new interconnected elements formed by molding.

None of the prior art devices show apparatus in which molded sections of chain are molded in and advanced by sets of molds while being retained by certain of the dies and with return of a set of dies to a beginning location for advance with the chain upon molding.

None of the prior art devices show apparatus or methods utilizing continuously advanced side dies for molding a link into a previously molded length of chain to provide a continuous chain.

SUMMARY OF THE INVENTION

In accordance with the invention apparatus is provided for molding a connected line of links, advancing the molded links in sets of links to advance the chain, successively returning sets of molds from the back to the front of the machine, thereby providing a continuous chain of the desired length without manual insertion of an end link for attachment of another length of links.

It is the principal object of the invention to provide a machine for making a continuous chain with sets of dies preferably by molding a length of connected links and then by successive advance of sets of dies and return of a set of dies to the front of the machine for advance to provide continuity of links.

It is a further object of the invention to provide a machine for making a continuous chain and which is particularly suitable for molding the connected links of synthetic plastic.

It is a further object of the invention to provide a machine of the character aforesaid in which the links can be of different colors.

It is a further object of the invention to provide a machine for making a continuous chain in which the chain is transferred out of the dies in a continuous fashion while under the control of a pair of dies.

It is a further object of the invention to provide a machine for making a continuous chain of molded links, one link extending into the molding area for interlooping with an end link of a subsequently molded length of links.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, an upper vertically movable die carrying frame plate 15, intermediate fixedly mounted die carrying frame plate 16 and a lower vertically movable die carrying plate 17 are provided. In order to simplify the description, wear plates and die retainers have been omitted.

The intermediate plate 16 has a central longitudinally extending slot 20 for the reception and movement therealong of certain dies, as hereinafter explained, has a transverse slot 21 at the front end, a transverse slot 22 at the rear end and parallel side slots 23. Each of the slots 23 has die guides 24 mounted therein with longitudinal die guiding and retaining slots 25 which extend to and terminate at the end slots 21 and 22.

The lower die carrying plate 17 is mounted on the intermediate plate 16 and limited as to its downward movement by studs 28 engaged in the bottom of the plate 16. The studs 28 have heads 29 engaging with shoulders 30 in the lower plate 17. A plurality of compression springs 31 carried in the plates 16 and 17 permit upward movement of the lower plate 17 against the resilient force of the springs 31. The lower plate 17 can be moved upwardly and downwardly in timed relation by any suitable mechanism.

The lower plate 17 has a longitudinally extending lower or bottom die 33 with bottom side ribs 34 carried thereby and extending upwardly through a slot 35 in the plate 16 for upward and downward movement. The die 33 is removably retained on the plate 17 by a retainer plate 36 and screws 37.

The upper plate 15 has a longitudinally extending top die 40 carried thereby with side guiding and aligning inserts 41. The upper plate 15 can be moved upwardly and downwardly in timed relation by any suitable mechanism.

Figure 2:
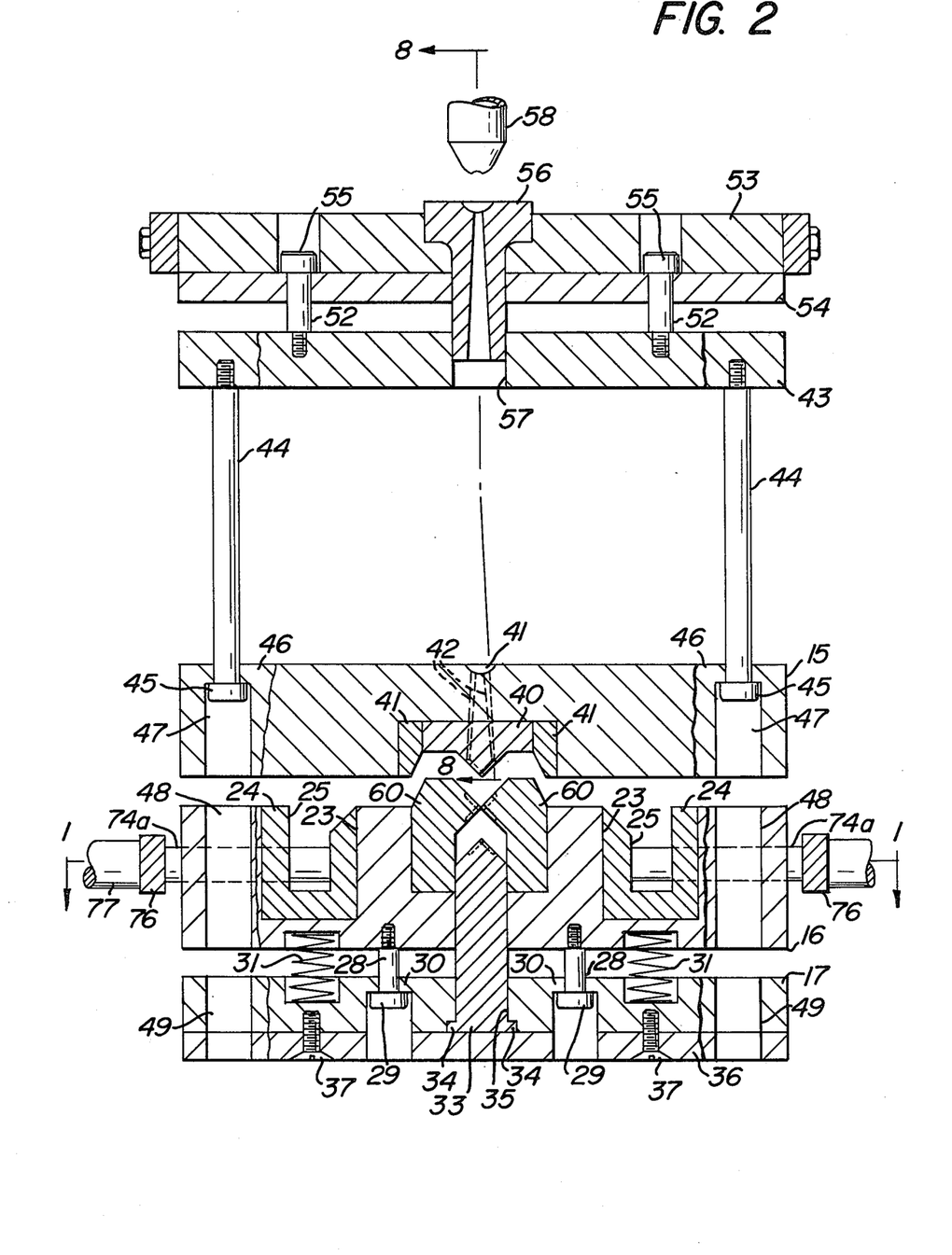
FIG. 2 is a vertical sectional view, enlarged, taken approximately on the line 2—2 of FIG. 1.
Figure 3:
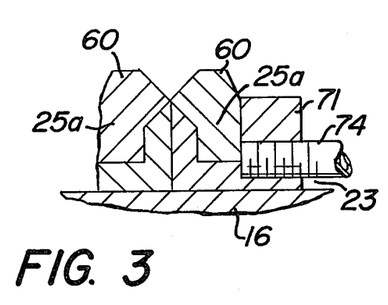
FIG. 3 is a vertical sectional view, enlarged, taken approximately on the line 3—3 of FIG. 1.
Figure 4:
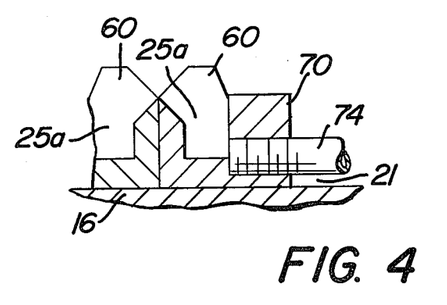
FIG. 4 is a vertical sectional view, enlarged, taken approximately on the line 4—4 of FIG. 1.

As illustrated in FIG. 2, and for chain links of a single color, the top face of the top die 40 can be provided with a runner groove 41 and sprue holes or gates 42 extending to some but preferably not to all of the die cavities as pointed out below. Any other suitable arrangement can be employed for feeding the material to be molded.

Figures 5, 6:
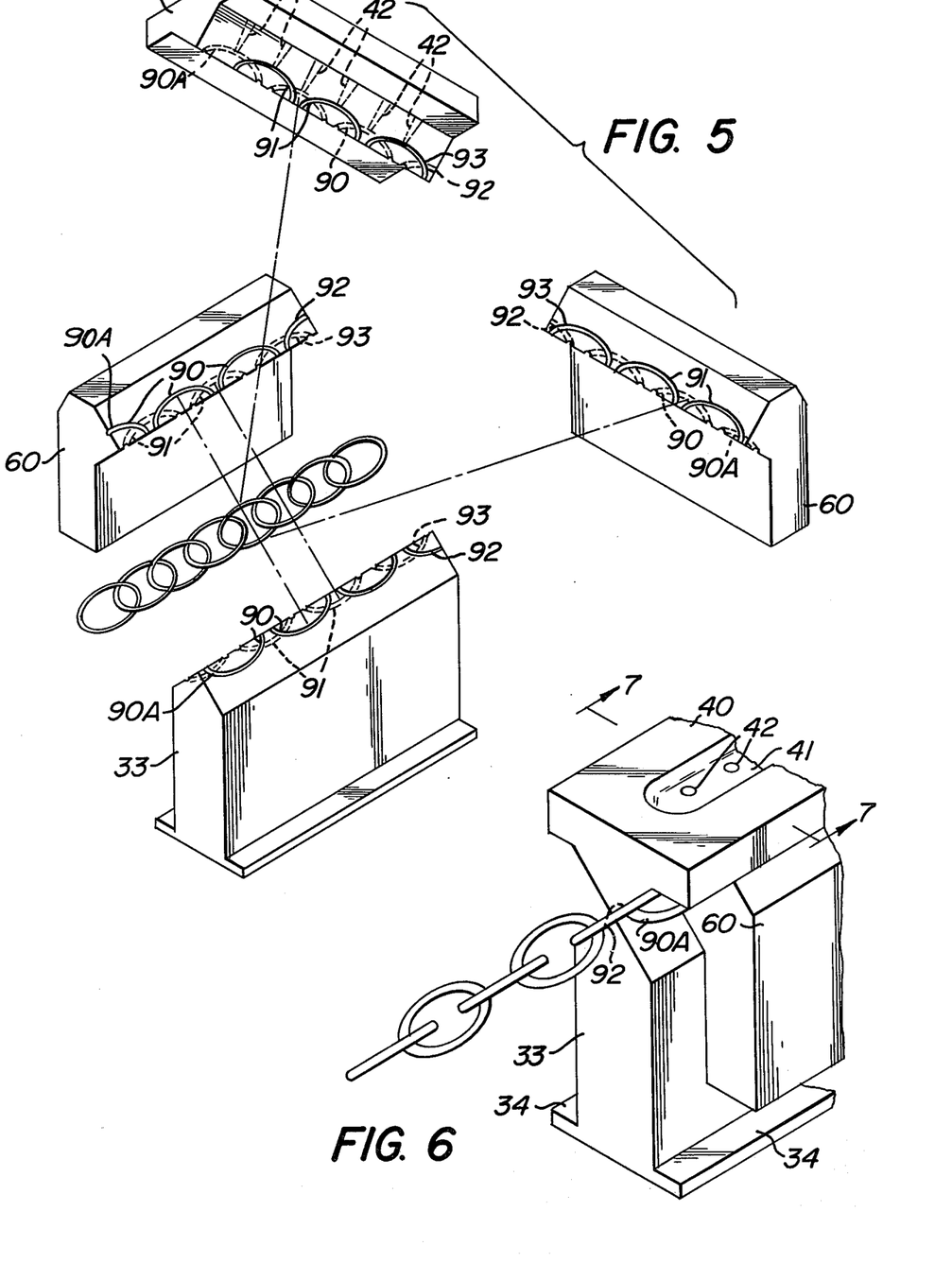
FIG. 5 is an exploded perspective view of one set of dies with their cavities.
FIG. 6 is a fragmentary perspective view, enlarged, and as seen from the right of FIG. 5, of the dies in closed position for the retention of the last link of a previously formed length of chain.
Figure 7:
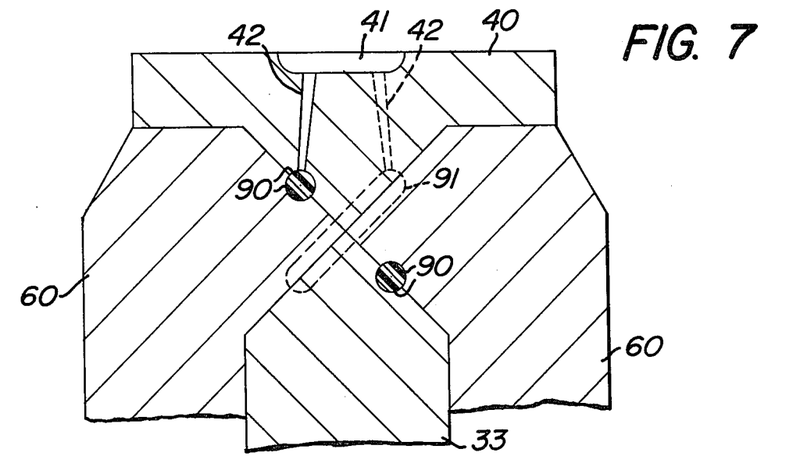
FIG. 7 is a vertical sectional view, enlarged, taken approximately on the line 7—7 of FIG. 6.
Figure 8:
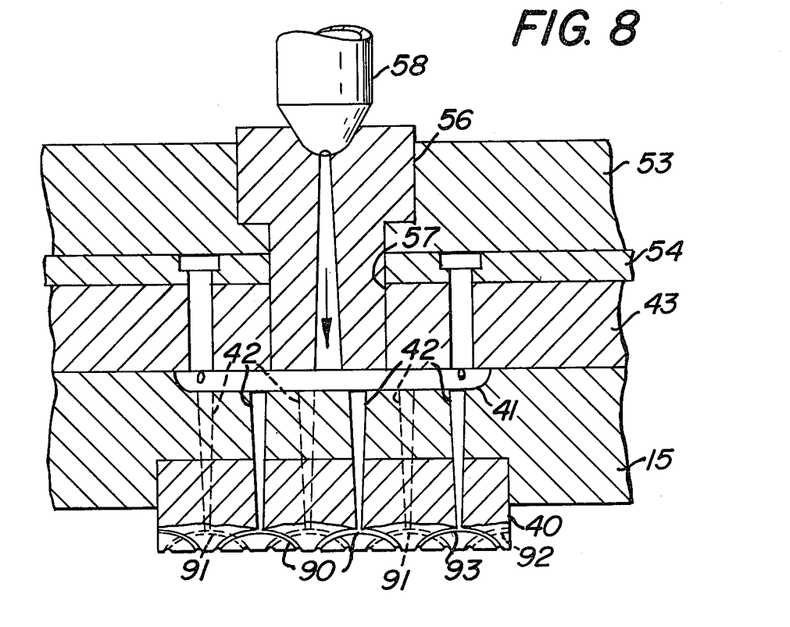
FIG. 8 is a vertical sectional view, enlarged, taken approximately on the line 8—8 of FIG. 2.

One suitable feeding system for supplying plastic to the groove 41 comprises a feeder plate 43 having a plurality of rods 44 with heads 45 engageable with shoulders 46 at the upper ends of vertical holes 47 in the plate 15. The holes 47 have aligned therewith holes 48 in the plate 16 and holes 49 in the plates 17 and 36, which limit the upward movement of the plate 43 and permit downward movement of the feeder plate 43. The feeder plate 43 is connected by bolts 52 to a nozzle plate 53 having a clamping plate 54 secured thereto to provide a lost motion connection with abutment against the plate 54 of the heads 55 of the bolts 52. The nozzle plate 53 carries a nozzle 56, movable downwardly in an opening 57 in the feeder plate 43 to deliver plastic to the runner groove 41 when the nozzle 56 is engaged therewith and the feeder pipe 58 is engaged with the nozzle 56 (see FIGS. 2 and 6).

The dies employed for chain formation, in addition to the bottom die 33 and the top die 40, include side dies 60, three pairs being shown.

The side dies 60 are movable together in opposite pairs along the central slot 20, being impelled from the front slot 21 toward the rear slot 22 by pusher rods 62 extending through openings 63 in the frame plate 16, and operated by the piston rod 64 of a fluid motor 65 which is supported by a frame 66 secured to the frame plate 16.

The positioning of the side dies 60 in the frame plate 16 is determined by the central slot 20, the front die carriers 70 for the side dies 60 and the rear die carriers 71 for the side dies 60.

The front die carriers 70 are similar in cross section to the die guides 24, and are each of a length corresponding to the lengths of the side dies 60 and are slidable transversely toward and away from each others front end slot and have slots 25a for the reception of the side dies 60 and alignment with the slots 25.

The front die carriers 70 are positioned by pusher rods 74 extending through openings 75 in the frame plate 16 for operation by a bar 76 on each side, which is positioned by a piston rod 77 operated on one side by a fluid motor 78 and on the other side by a fluid actuated motor 79. The motors 78 and 79 can be supported by frames 80 secured to the frame plate 16.

The rear die carriers 71 are positioned by pusher rods 74a which extend through openings 75a in the frame plate for operation by the bars 76 in the same manner and simultaneously with the front die carriers 70 by the motors 78 and 79, and have slots 25a for alignment with the slots 25.

The pair of side dies 60 at the rear of the frame plate 16 and in alignment with the other pairs of dies 60 in the central slot 20 can be separated by outward movement of the rear die carriers 71 to positions where their slots 25a are aligned with the slots 25 of the die guides 24, the front die carriers 70 being simultaneously moved to align their slots 25a with the slots 25.

In order to return the separated side dies 60 to the front of the machine, pusher rods 83 are provided movable in openings 84 in the frame plate 16. The pusher rods 83 are carried on a bar 85 to which a piston rod 86 is connected operated by a fluid motor 87 carried by a frame 88 secured to the frame plate 16.

Upon subsequent inward movement of the die carriers 70 and 71, the slot 25a of the front carrier is aligned with the slot 20 for movement of the returned pair of dies 60 along the slot 20 and for movement of the rearmost pair of side dies 60 into the slot 25a of the rear die carriers 71 by the pusher rods 62.

The bottom die 33, top die 40 and side dies 60, considered together, are V-shaped mold quarter sections arranged to fit together face to face to form a closed mold. The meeting faces of the dies have complemental mold cavities for the reception of the plastic to be molded. The mold cavities 90 and 90A for the formation of links in one plane have mold cavities 91 for the formation of links in a plane which is shown at 90° with respect thereto but which can be another angle if desired so as to provide interengaged links. The size and shape of the mold cavities can be varied as desired to provide links circular, oval, elongated or of other shape with the same or varied cross section.

The number of full links to be formed at one time can be varied as desired but within the confines of 33 and 40 overlapping the side dies 60 and the number must be an even number.

It will be noted that the top and bottom dies 40 and 33 are longer than the side dies 60. The purpose for this is to provide for molding a connecting or interlocking link engaged with the last full link in the previously molded group of links. To accomplish this, the cavities indicated at 92 grip the last full link which has been molded at 90A so that upon molding of the next group, the interlock is provided at 93.

Figure 9:
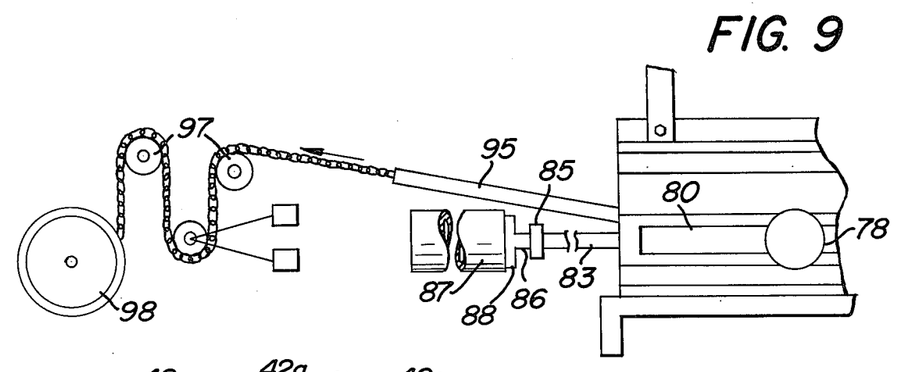
FIG. 9 is an elevational view showing the removal of the completed chain as molded.

In FIG. 9, one mode of handling the completed chain is shown, the chain exiting through a tube 95 connected to a chain exit opening 96 is directed over guide pulleys 97 for storage on a drum 98.

Figure 10:
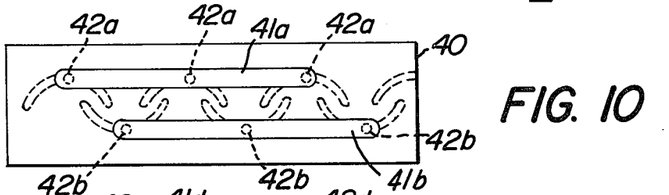
FIG. 10 is a plan view of the top section showing the provisions for making a chain with links of two colors.
Figure 11:
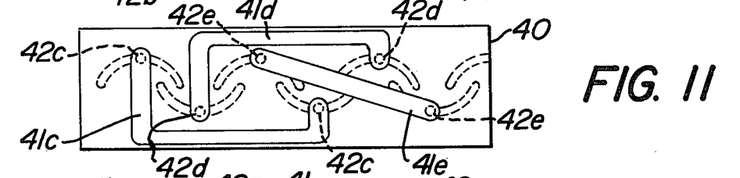
FIG. 11 is a view similar to FIG. 10 showing the provisions for making a chain with links of three colors.
Figure 12:
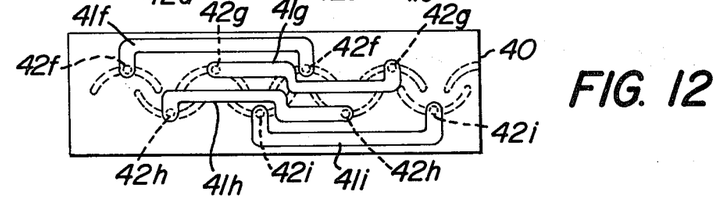
FIG. 12 is a view similar to FIG. 10 showing the provisions for making a chain with links of four colors.

In FIGS. 10, 11 and 12, the arrangements of the runner grooves and gates in a top die 40 for making multicolored links is illustrated.

In FIG. 10, the top die 40 has two runners 41a and 41b for two different colors with sprue holes 42a and 42b extending to the respective mold cavities for two different colors of plastic.

In FIG. 11, the top die 40 has three runners 41c, 41d, and 41e for three different colors respectively, with sprue holes 42c, 42d, and 42e extending to the mold cavities for three different colors of plastic.

In FIG. 12, the top die has four runners 41f, 41g, 41h, and 41i for four different colors respectively, with sprue holes 42f, 42g, 42h, and 42i extending to the mold cavities.

The mode of operation will now be pointed out.

Figure 1:
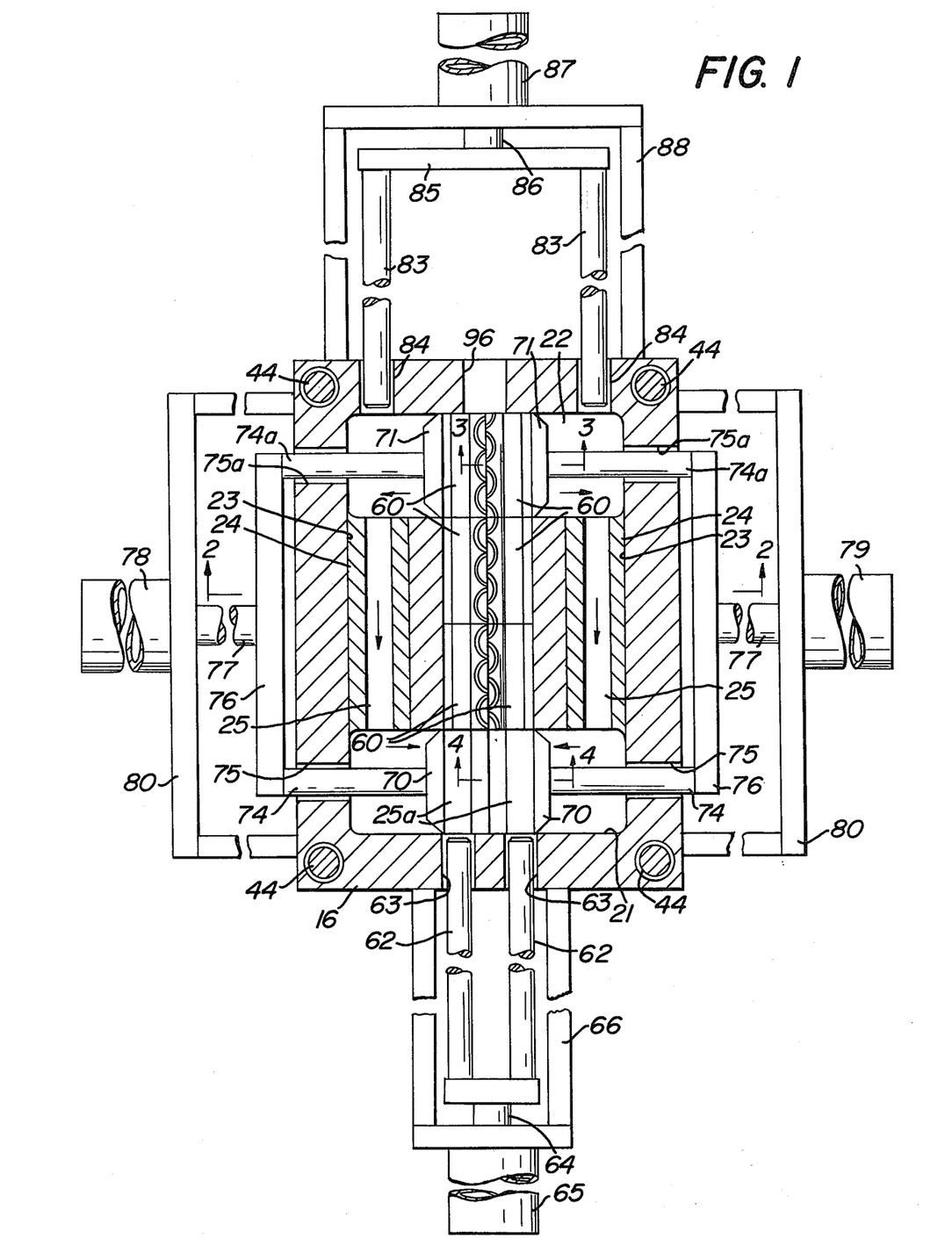
FIG. 1 is a horizontal sectional view of machine in accordance with the invention taken approximately on the line 1—1 of FIG. 2.

Referring to FIG. 1, and assuming the dies 33, 40 and 60 in closed position and with the top die 40 above the middle pair of dies 60, plastic is supplied to the runner groove 41 and sprue holes 42 to the die cavities and filling the same. When the plastic has had an opportunity to harden, the top die 40 and bottom die 33 are retracted, the rearmost pair of dies 60 are moved outwardly by their die carriers 71 to positions aligned with the outer slots 25, are moved forwardly by the pusher rods 83 along the slots 25 and into the front die carriers 70. The die carriers 70 and 71 are returned to their initial positions and the pusher rods 62 advance the pairs of side dies 60 so that the intermediate pair in which a length of chain was molded is moved to the rear into rear die carriers 71. The top and bottom dies 40 and 33 are returned to their initial positions and into engagement with the pair of side dies 60 which have been moved to the intermediate position and plastic is supplied to the die cavities in the engaged dies 33, 40 and 60 as before.

The operation is repeated as desired.

The chain links as molded are advanced by the side dies 60 in engagement therewith.

As pointed out above, a trailing link is available, half the link being held in mold cavities 92 in the sides, upper and lower dies 60, 40, and 33 for the next molding operation in which the first link 93 of the new set is molded into interlocking engagement therewith to provide a continuous chain.

I claim:

1. Apparatus for molding a length of plastic chain formed of interengaged chain links comprising
   an intermediate fixedly mounted die carrying plate having a longitudinal main slot and side slots therealong,
   pairs of die members having mold cavities therein, and movable in said slots,
   die carriers at the rear end of said main slot for the reception of said die members advanced to said rear end and for moving said die members to positions adjacent said side slots,
   means positioning said die carriers,
   means carried by said plate for urging said die members along said side slots to the front of said plate,
   die carriers at the front end of said slot for positioning said pairs of die members at said front end,
   means positioning said die carriers at said front of said slot,
   means carried by said plate for urging said die members along said main slot,
   additional die members for positioning in meeting relation to at least one of said pairs of dies at a predetermined position along said slot,
   said additional die members having mold cavities therein cooperating with the mold cavities in the dies of one of said pairs to provide die cavities for interengaged links of chain, and
   means supplying moldable material into said die cavities.

2. Apparatus as defined in claim 1 in which said pairs of dies are side dies, and said additional die members include retractible top and bottom die members.

3. Apparatus as defined in claim 2 which
one of said die members has a runner groove therein and sprue holes extending to said die cavities for delivery of moldable material into said die cavities.

4. Apparatus as defined in claim 3 in which
one of said die members has a plurality of runner grooves therein for the reception of differently colored material for molding links of different colors.

5. Apparatus as defined in claim 1 in which
said die carriers are disposed on each side of the center of said slot, and
said means for the return of said die members include motor members advancing and retracting said die carriers.

6. Apparatus as defined in claim 1 in which
the die members of at least one said pair retain molded chain therein for advance of said chain toward the rear end of said main slot.

7. Apparatus as defined in claim 1 in which
said pairs of die members and said additional die members have elongated portions of V-shape with the meeting faces of the elongated portions adapted for meeting engagement,
meeting pairs of said faces having mold cavities therein in intersecting planes for molding interengaged links of chain.

8. Apparatus as defined in claim 2 in which
said top and bottom die members are of greater length than said die members and have cavities for retaining a molded link for subsequent attachment of the end link of additional plurality of links.

9. Apparatus as defined in claim 1 in which
said means for the return of said die members in said side slots include pusher rods, and
motor means connected to said pusher rods for actuating said pusher rods.

10. Apparatus as defined in claim 1 in which
said means for the movement of said die members in said main slot include additional pusher rods and motor means actuating said pusher rods.

* * * * *

UNITED STATES PATENT OFFICE
CERTIFICATE OF CORRECTION

Patent No. 4,095,932    Dated June 20, 1978

Inventor(s) Frank Tome

It is certified that error appears in the above-identified patent and that said Letters Patent are hereby corrected as shown below:

Column 7,

Line 3, after "2", insert - in - .

Signed and Sealed this

Twenty-eighth Day of November 1978

[SEAL]

Attest:

RUTH C. MASON
Attesting Officer

DONALD W. BANNER
Commissioner of Patents and Trademarks